July 5, 1966  E. R. MICHALIK ETAL  3,259,480
METHOD OF REMOVING SURFACE DEFECTS FROM GLASS SHEETS
Filed Dec. 17, 1962  5 Sheets-Sheet 1
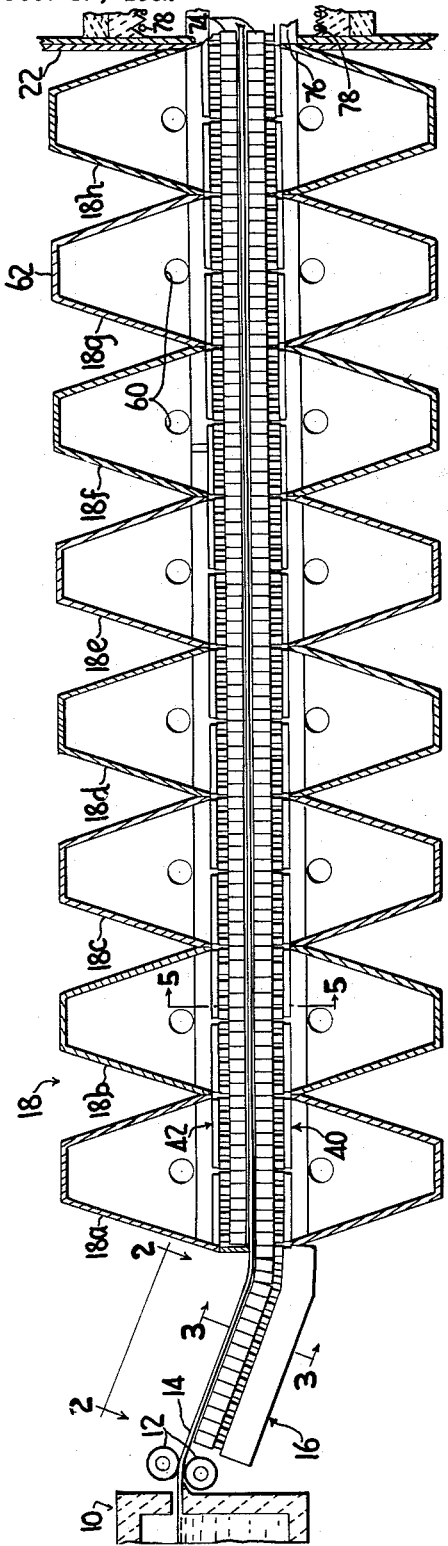
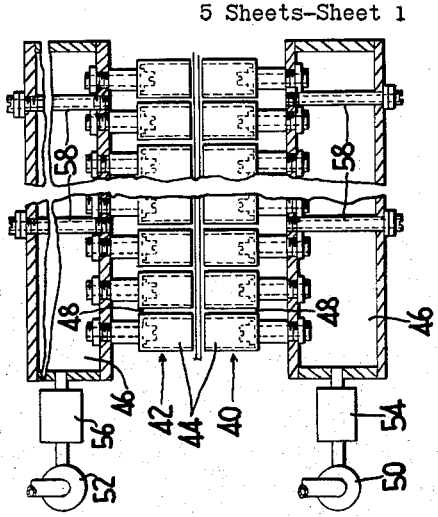
INVENTORS
EDMUND R. MICHALIK and
GEORGE W. MISSON
BY
Oscar H. Spencer
ATTORNEY July 5, 1966 E. R. MICHALIK ETAL 3,259,480
METHOD OF REMOVING SURFACE DEFECTS FROM GLASS SHEETS
Filed Dec. 17, 1962 5 Sheets-Sheet 2

INVENTORS
EDMUND R. MICHALIK and
GEORGE W. MISSON
BY
Oscar B. Spencer
ATTORNEY

July 5, 1966     E. R. MICHALIK ET AL     3,259,480

METHOD OF REMOVING SURFACE DEFECTS FROM GLASS SHEETS

Filed Dec. 17, 1962     5 Sheets-Sheet 3

INVENTORS
EDMUND R. MICHALIK and
GEORGE W. MISSON
BY
Oscar L. Spencer
ATTORNEY

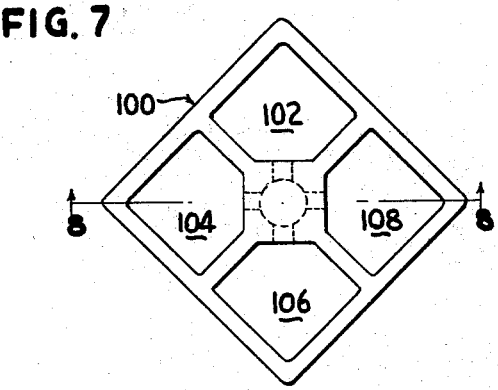
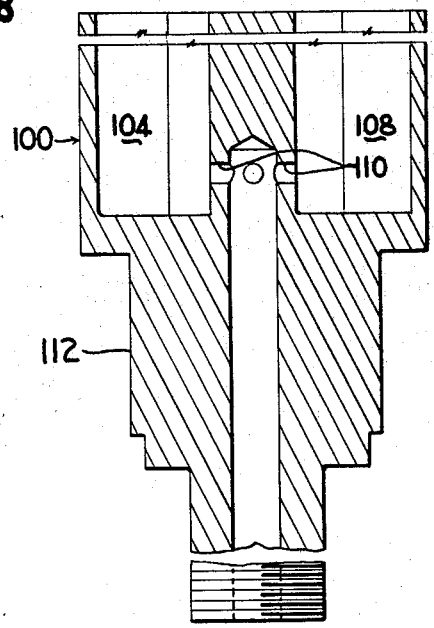

July 5, 1966  E. R. MICHALIK ETAL  3,259,480
METHOD OF REMOVING SURFACE DEFECTS FROM GLASS SHEETS
Filed Dec. 17, 1962  5 Sheets-Sheet 5

INVENTORS
EDMUND R. MICHALIK and
GEORGE W. MISSON
BY
*Oscar B. Spencer*
ATTORNEY

United States Patent Office 3,259,480
Patented July 5, 1966

3,259,480
METHOD OF REMOVING SURFACE DEFECTS FROM GLASS SHEETS
Edmund R. Michalik, West Mifflin, and George W. Misson, Pittsburgh, Pa., assignors to Pittsburgh Plate Glass Company, Pittsburgh, Pa., a corporation of Pennsylvania
Filed Dec. 17, 1962, Ser. No. 245,154
9 Claims. (Cl. 65—28)

This application relates to the removal of surface defects from glass sheet and more particularly to a process of surface defect removal from glass sheet without the use of abrasives or apparatus which contacts the surfaces of the glass sheet.

In accordance with the method of this invention, one surface of the glass sheet is exposed to a temperature at which the glass flows while simultaneously the opposed surface is exposed to a lower temperature which is one of substantial magnitude below that at which the glass flows and sufficient to maintain the temperature thereof above the strain point temperature of the glass. Both surfaces of the glass sheet are treated successively in this manner, so as to produce a glass sheet of a surface quality which approaches the quality of ground and polished plate glass, and at a much reduced manufacturing cost. Even where the surface does not achieve optimum quality, further surface improvement can be achieved by grinding and/or polishing at lower cost.

In a typical embodiment of this invention, glass is formed into ribbon configuration by means of forming rolls which roughly size the glass to a predetermined thickness. The rolls, in order to grip the viscous glass, are generally knurled, so that the resultant ribbon exhibits a rough or knurled surface. Smooth surfaced rolls may be used to rough size the ribbon, but they too, it has been founnd, produce a glass ribbon with a marred or knurled-like surface.

In the prior process of producing high quality glass, the rough ribbon is ground and polished with abrasives including sand and rouge, so as to produce a product having a smooth surface of high luster. The cost of such finishing procedure is extremely high because of the quantity of machinery required—grinding and polishing lines have been, at times, a mile in length—the quantity of glass which is removed and cannot be recovered, the quantity of abrasives and vehicles, such as water, required, power required to operate the machinery, manpower required to operate the machinery, etc. In addition, flaws are introduced into the surface of the product, so that the finished glass requires rigid inspection for quality. Thus, the yield of acceptable finished glass is less than that quantity actually finished.

The present invention is directed to the problem of eliminating some of these difficulties and/or simplifying the production of glass in sheet form.

In the performance of the process of this invention, the glass ribbon is treated without physical contact with a supporting surface or means until the glass is cool enough so that the brilliant and smooth surface produced is not damaged. To do so, a specially designed and controlled fluid support is used, which fluid support may be divided into a plurality of zones, and which uniformly supports the glass free from physical surface contact with surfacing or finishing equipment.

The attendant advantages of this invention and the various embodiments thereof will be readily appreciated as the same become better understood by reference to the following detailed description when considered in connection with the accompanying drawings, in which:

FIG. 1 is a diagrammatic longitudinal section through an apparatus for performing the method of this invention;

FIG. 2 is a diagrammatic plan view of the rolls and apron of the apparatus illustrated in FIG. 1;

FIG. 3 is a diagrammatic cross-sectional view taken on line 3—3 of FIG. 1 showing constructional details of the apron;

FIG. 5 is a cross-sectional view taken on line 5—5 of FIG. 1 showing other constructional details of the apparatus of FIG. 1;

FIG. 7 is a plan view on an enlarged scale of another type module unit in which the support area is subdivided by partitions;

FIG. 8 is a section taken along line 8—8 of FIG. 5;

Figure 4:
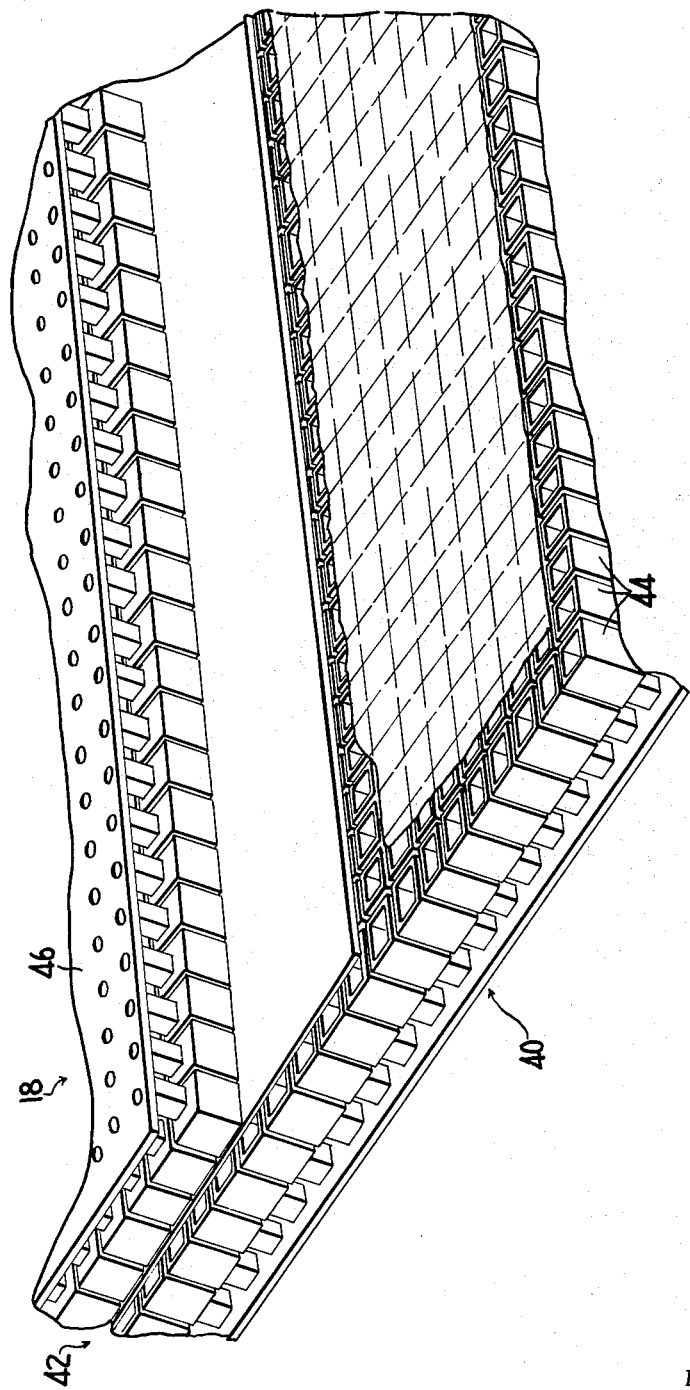
FIG. 4 is a partial perspective of the apparatus of FIG. 1 showing many constructional details thereof.

Turning now to FIG. 1 of the drawing, there is shown the discharge end of a glass melting tank 10 and a pair of cooperating forming rolls 12 which from a ribbon of glass 14 from glass discharged from the tank 10. The forming rolls 12 are conventional in construction and have knurled surfaces for gripping the glass which knurled pattern is imparted to the ribbon 14. The product produced by the rolls 12 is known in the industry as rough rolled glass and has the thickness desired as adjusted by the spacing of the rolls. In accordance with standard practice, the drawing rolls 12 are water cooled, so as to reduce the temperature of the glass being formed and thus increase its viscosity. The formed ribbon, while deformable, is of such a viscosity to retain its shape and surface characteristics.

The glass ribbon 14, so formed, is delivered to an apron 16, which may be of any convenient construction but is preferably a gas support device. Such a device insures a flat ribbon of glass being delivered for surface defect removal as will be described. The constructional details of the gas support apron 16 will be later described.

From the apron 16, the glass ribbon is delivered to the defect removal apparatus, generally identified with the reference character 18. The ribbon 14 is driven through the apparatus 18 by the driving force of the forming rolls and also conventional conveyor rolls within an annealing lehr 22 which contact the glass after its temperature has been reduced to a value below the annealing range at which no surface damage occurs. In this apparatus 18 and while the glass ribbon 14 is passing therethrough, one surface of the glass is exposed to a temperature at which the glass at the surface is caused to flow, while simultaneously the other surface of the glass is maintained at a temperature below that at which the glass flows but at a substantial temperature, i.e., a temperature above the strain point temperature of the glass. The expression "strain point temperature" as used herein and in the appended claims is the temperature of the lower limit of the annealing range. The surfacing procedure just described is repeated for the opposite surfaces of the glass. The surface defects, such as knurl marks, are removed by holding the glass surfaces, at a temperature at which the glass flows for a long enough period, one after the other, while the ribbon retains its identity by maintaining the opposite surface at a temperature below the glass flow temperature and above the strain point temperature of the glass. By following the procedure thus described and while so supporting the glass, no bow or wave is introduced into the ribbon, which is maintained in its flat condition. A detailed description of the constructional details of the apparatus 18 will follow.

The ribbon of glass, after being surface treated, as described, is then delivered to the annealing lehr 22 where its temperature is reduced at a controlled rate to remove stress and strain and to a temperature where the glass can be handled without damage to its surfaces. The supporting media at the entrance end of the annealing lehr 22 is a continuation of the gas supporting apparatus used in the apron and treating sections. At the exit end of the lehr, conventional rolls (not shown) may be used for supporting and driving the ribbon. Because the temperature of the glass at the exit end of the lehr is sufficiently low, it can be safely handled without surface damage. The glass ribbon upon exiting from the lehr 22 is ready for cutting into smaller sheets of glass in accordance with wareroom orders. Any known conventional cutting apparatus may be employed, so that such apparatus, which does not form a part of this invention, is neither shown in the drawing nor will be described in any detail.

Looking now at FIG. 2, we see a diagrammatic plan view of the apron 16 over which the glass passes from the rolls to the surface defect removing apparatus 18 constructed of a flat bed of modules 26 in spaced but close juxtaposition each to the other and arranged geometrically like a mosaic. FIG. 3, on a larger scale, better illustrates the modules and the apron construction. In the embodiment illustrated, all modules 26 have their upper termini of rectangular configuration and lying in a common plane, which in the case of this apron 16 is angled with respect to the horizontal, as is common practice with respect to apron arrangements. Adjustment of the plane of the bed is achieved by any conventional adjusting means and as adjustment is common practice, such adjusting means are not described or claimed. The modules 26 are arranged in successive rows crossing the intended path of travel of the formed ribbon of glass 14. In the embodiment illustrated each row is at an angle of substantially 90 degrees from the path of travel of the ribbon and spaced close to the next adjacent row as hereinafter described in more detail.

Each module 26 has a stem 28 of smaller cross sectional area than the upper terminus and each opens into a plenum chamber 30 positioned below the bed and acting as a support therefor. See FIG. 3. Each module is substantially enclosed and separated from other modules by an exhaust zone identified as 32 on the drawings.

A gas, such as air, is supplied to the plenum chamber 30 by a blower 34 under a positive pressure sufficient to support the relatively hot ribbon 14 against deformation and spaced a predetermined distance above the top of the module bed. In order to prevent undue chilling of the glass ribbon 14 as it passes from the forming rolls 12 to the surface defect removal apparatus 18, the gas is preheated by a heater generally identified as 36 of known construction.

Exhaust gas flows through exhaust spaces 32 and then through exhaust conduits 38 to the atmosphere. The relatively hot exhaust gas may be recycled to the heater 36, the blower 34 and back to the plenum 30 if desired; however, the necessary ducting is not shown on the drawings.

The glass ribbon 14, after passing over the apron 16 from the forming rolls 12 is delivered into the surface defect removal apparatus 18. Within the apparatus 18, the upper and lower surfaces of the glass are sequentially heated to a temperature at which glass flow occurs while the opposite surface is maintained at a temperature below that temperature and at or above the strain point temperature of the glass. To accomplish this, the apparatus is divided into a plurality of sections 18a, 18b, 18c, 18d, 18e, 18f, 18g and 18h, each section being substantially alike in construction. While there are eight sections shown and described, it will be understood that a greater or lesser number of sections could be used, depending solely on design and operational characteristics. The operational characteristics of each section vary, as will be explained hereinafter.

Each section, 18a, etc., includes a pair of spaced flat module beds 40, 42, arranged in horizontal planes. The module beds 40 are below the ribbon 14 while the module beds 42 are above the ribbon. The module beds 40, 42 are generally similar in construction and each includes a plurality of modules 44 in spaced but close juxtaposition each to the other and arranged geometrically like a mosaic. See FIG. 5 for constructional details.

In the embodiment illustrated all modules 44 have their upper termini of rectangular configuration and lying in a common plane. The modules 44 are arranged in successive rows crossing the intended path of travel of the ribbon of glass. In this embodiment, each row is at an angle of substantially 90 degrees from the path of travel of the ribbon and spaced close to the next row as hereinafter described in more detail.

Each module 44 has a stem of smaller cross-sectional area than the outer terminus and each opens into a plenum chamber 46 acting as a support therefor. For descriptive purposes, where necessary, each plenum chamber will be identified therein by reference to the section, and its position with reference to the glass ribbon, as for example, 46al, 46au, 46bl, 46bu, etc., where $l$ and $u$ refer to lower and upper, respectively. Each module 44 is substantially enclosed and separated from other modules by an exhaust zone identified as 48.

A gas, such as air, is supplied to each lower plenum chamber 46 by a blower 50 under a positive pressure sufficient to support the ribbon a predetermined distance above the lower module beds 42, spaced from the upper module beds, and also to oppose the gas under pressure being directed downwardly on the ribbon from the upper module beds 40. A gas, such as air, is also supplied under a positive pressure to the upper plenum chambers 46 by means of blowers 52.

In order to perform the objects of this invention and to accomplish the desired surface defect removal, individual heaters 54 and 56, for each lower and upper plenum chamber, respectively, are provided. Each heater is a known type capable of preheating gas to the desired temperature. Because the temperature of the gas supplied to and discharged through each section differs and also because the temperature differs between upper and lower positions, each heater is individually controlled in any conventional manner.

There is provided a plurality of gas exhaust ducts 58 connecting the exhaust zones 48 with exhaust headers 60 opening into the side of the apparatus. The headers 60 discharge exhaust gases to the atmosphere or additional duct work may be provided for recycling the exhaust air. Such arrangement is not illustrated in the drawings, but would be obvious to a skilled mechanic.

In order to conserve heat, and to insure substantially uniform heat from side to side of the ribbon, each section of the apparatus is covered by an insulating shell, generally identified as 62. The particular details of the insulating shield are obvious from the drawings and require no detail description.

The apparatus just described is supported by longitudinal beams (not shown) extending the length thereof. An upright supporting frame (not shown) supports the beams in horizontal position.

The operational characteristics of the apparatus 18 will be summed up later when particular reference is made to the curves of FIGS. 9 and 10.

From the surface defect removal apparatus 18, the ribbon of glass, now with improved surfaces, passes into and through the annealing lehr 22. This lehr 22 is conventional in construction except for its glass ribbon supporting structure at the entrance end thereof and extending sufficient distance therewithin to a location where the ribbon may be handled without damage to its surfaces.

The entrance end of the lehr 22 contains a lower gas supporting bed which is substantially like the supporting apparatus of the apron 16 and the surface defect removal apparatus 18 in that it is constructed of a plurality of modules 74 in spaced but close juxtaposition each to the other and arranged geometrically like a mosaic. All of the modules have their upper termini of rectangular configurations and lying in a common plane. The modules 74 are arranged in successive rows crossing the intended path of travel of the ribbon of glass 14. Each row is at an angle of approximately 90 degrees from the parts of ribbon travel and spaced close to the next adjacent row. Each module is of substantially the same construction and arrangement as those described previously and each is connected and supported by a plenum 76 to which a gas at predetermined positive pressure and temperature is delivered by a blower and heater arrangement similar to those previously described. The glass is thus supported out of contact with the module bed. The plenum 76 may require sectioning to provide for a temperature gradient; however, such is within the skill of the art and requires no detailed discussion. To temperature condition the interior of the lehr, heater means, such as glow bars 78, are provided in the upper and lower parts of the lehr. These are connected to a source of electrical energy and are generally individually controlled.

After the glass ribbon has been annealed, it may be handled without damage to its surfaces, so that conventional roller conveyors may be used near the exit end of the lehr 22. As such conveyors are conventional, they are not shown or described. The roller conveyors assist in driving the ribbon through the lehr. The glass ribbon after exiting from the annealing lehr is cut into desired sizes by any known cutting means.

In accordance with the teachings of this invention, highly developed and refined supporting and gas applying apparatus are provided to prevent the distortion of glass at deformation temperature. It is important in the process to have a very large proportion of the glass sheet or plate supported by a uniform force and to uniformly apply gas to the upper surface of the glass. This prohibits flowing the gas in a lateral direction between a bed and the glass because of the creation thereby of a progressive pressure drop along the path of flow and, hence, a nonuniform force. Furthermore, gas introduced from a plurality of points beneath or above the glass is exhausted beneath the adjacent area rather than merely by lateral flow to the glass edges to prevent a pressure build-up centrally of the glass sheet that may otherwise tend to cause thinning of the glass in a central area. The gas, having exhausted to zones spaced from the termini of the modules and adjacent the stems thereof, then flows principally to the sides of the bed through the exhaust channels 58 and through ducts 60.

Of course, if the gas discharge zones are small in comparison with the exhaust areas, the gas pressure will not be substantially uniform. If the exhaust areas are large in magnitude, thinner sheets of glass overlying these areas will have a tendency to sag. Conversely, if the support areas are too large and exhaust areas too small, thinning of the glass in a central area tends to occur. Also, the pressure differential between the net supporting pressure and the exhaust pressure must be controlled to avoid sagging of the glass.

Finally, it is important that the gas be discharged onto the glass in the form of a diffused and relatively small gas flow to provide substantially uniform pressure across the width of the glass, thereby avoiding deformation, such as dimpling, from velocity pressure due to the direct impingement of localized jets of gas against the glass surfaces.

Figure 6:
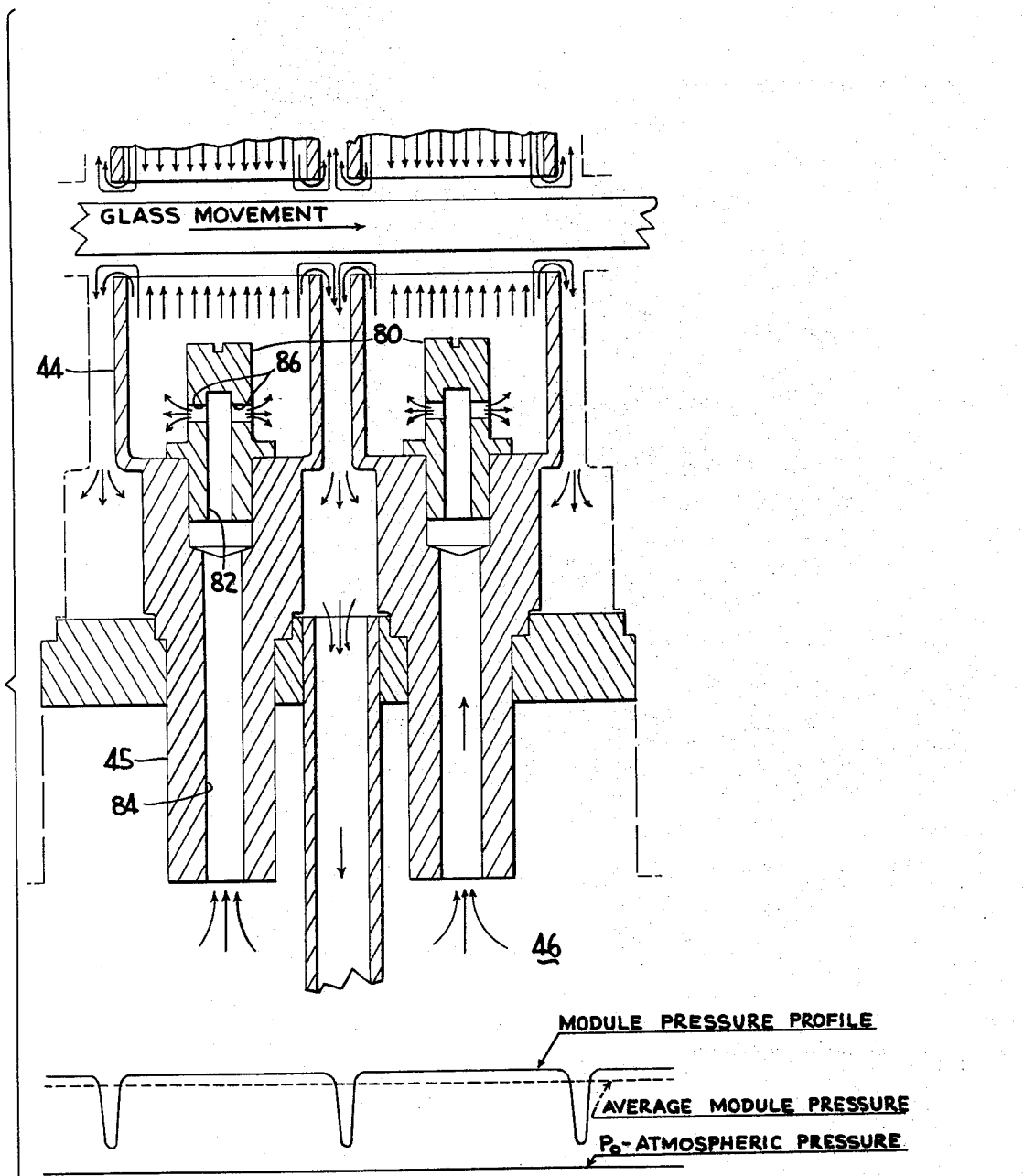
FIG. 6 is a schematic view on an enlarged scale of a section of the gaseous fluid support bed showing diagrammatically the flow and exhaust of the support gases and presenting diagrammatic graphs in conjunction therewith.

The module embodiments illustrated in FIGS. 6, 7 and 8 when assembled to form a bed and suitably supplied with gas from a plenum chamber in a manner to be described in more detail, provide the uniformity required to process glass at elevated temperatures substantially free from distortion in the manner herein disclosed.

As shown schematically in FIG. 6, each module 44 (using the same reference character as used in describing the surfacing apparatus 18 and which following description is also applicable to the modules 26 and 74 of the apron and lehr sections, respectively) forms an open-topped chamber, being essentially closed on its other sides, the upper terminus of which defines a zone of substantially uniform gas pressure, a profile of which is diagrammatically shown below the schematic view of the module. The pressure is exerted by gas supplied to each module from the supporting plenum chamber 46 by way of the hollow supporting stem 45. A nozzle 80, in threaded arrangement with an opening in the base of the module 44 and having a bore 82 connected with the bore 84 of the module stem 45, provides a gas inlet to the module chamber and also functions to diffuse the gas by changing the direction of flow to a horizontal direction as the gas escapes and expands into the module chamber through a plurality of bores or orifices 86 in the nozzle thus creating a relatively quiescent pressure zone over the module. The orifices are so disposed to prevent direct impingement of pressurized gaseous fluid against the glass surface, so as to prevent dimpling of the glass from the velocity pressure of a localized jet of gas. They deliver the gas to the module in a path which is initially out of the path of the glass. As shown in FIG. 6, the initial path is toward the module side wall below the outer edge thereof. However, the initial path may be downward, or as a horizontal spiral, or may be baffled or otherwise obstructed as long as it does not initially impinge aganist the glass. By feeding the gas into the large module chamber through a conduit or orifice which is smaller in cross section than the module, the gas diffuses into the gas of the chamber, producing a diffused flow, thus ensuring uniform pressure across the outer edges of the module.

Pressure profiles across the outer terminus of a module may be determined in the following manner: A pressure sensing plate having a small hole therethrough is positioned above a module and spaced from the upper terminus thereof a distance corresponding to the height of a supported sheet, e.g., 0.010 inch. A pressure transducer is connected to the sensing hole and the electrical output of the pressure transducer is connected to a recorder which will trace pressure variations on one axis and displacement of the pressure sensing plate on the other axis. The pressure transducer controls the displacement of the recording device along, e.g., the Y axis of the graph. A potentiometer, the shaft of which is rotated by relative horizontal movement between the sensing plate and the module, translates such movement to an electrical signal which controls the displacement of the recording device along the other, or X axis, of the graph.

Most advantageously, the relatively small size of orifices 86 of nozzle 80 provides a drop in gas pressure from the interior of the plenum to the interior of the module, and, in so doing, performs three important functions: first, it prevents modules not covered by the moving glass from allowing the rapid escape of gas from the common plenum, which would reduce the pressure in the plenum and, hence, in the covered modules; second, it prevents variations of load above a module from affecting the flow of gas from the plenum into the module; and, third, it diminishes the effect of any slight variations in plenum pressure upon the pressure within the module. With this arrangement, the gap between the upper terminus of the module and the lower surface of the supported glass becomes self-adjusting to a uniform size about the entire upper periphery of the module, which size is a function of the weight of the glass supported plus the pressure of the gas applied to the upper surface of the glass. This occurs because the flow of gas from the plenum through the module and to the exhaust area passes through two restrictions: the orifices 86 in the base of each module, and the gap between the upper terminus of the module and the glass. Because of the size of the orifices 86, there will be a substantially constant pressure drop through the orifices from the plenum to the module.

The pressure per unit area of cross section across the module is, under normal equilibrium conditions, equal to the weight per unit area of supported surface of the glass which it supports plus the pressure of the gas applied to the upper glass surface. However, the pressure drop between the plenum and the interior of the module is held high, usually at least twice and even as high as 50 to 100 times the pressure drop between the module interior and the exhaust area. Consequently, the gap between the module and the glass adjusts automatically in size (i.e., changing the height of support of the glass from the module) until this pressure is obtained thereby compensating for variations. Thus, if the gap becomes very small due to a heavy piece of glass, or an external force upon the glass, or a change in applied pressure (for example pressure applied by the module on the opposite side of the glass), the pressure within the module will increase until the pressure balances the load or until plenum pressure is reached as the gap approaches zero. If the gap were to diminsh to zero, there would be, of course, insufficient pressure to support the load. This cannot occur since, as the glass approaches the upper edge of the module, the pressure in the module rises toward the plenum pressure which is always well above that necessary to support the glass. Hence, the glass will be raised from the lower module by the gas in the module pressing against the lower surface of the glass under any module pressure greater than the weight of the glass plus the pressure of the applied gas from the upper module, thus increasing the size of the gap and reducing the module pressure due to escape of gas over the edges thereof. In this manner, the gap is self adjusting to a uniform size, dependent upon the weight of the glass, the pressure applied to the top surface of the glass, the plenum pressure and the size of the orifices.

The rate at which the pressure within the module builds up with decrease in the gap is a function of the rate of gas flow into the module and the volume of gas in the module. Hence, the orifice must not be so small for a given plenum pressure as to restrict the flow of gas into each module to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the outermost module edge.

Modules of small volume are more responsive for this purpose than are larger modules for a given flow rate. Generally, the modules herein contemplated have a volume desirably less than about 2 cubic inches especially when opposite the molten bottom surface of the glass. By forming the support bed and upper bed from identically constructed modules and supplying them with uniform but not necessarily equal pressure, each lower module will support the overlying portions of the glass along a desired surface and each upper module will apply a uniform pressure to the glass. The proximity of adjacent modules in the lower bed results in substantially uniform support under the entire area of the glass and assures a substantially flat product and one free of distortion.

As shown in FIG. 6, the gas within each module escapes across the outer terminus of the module walls to zones of lower pressure between adjacent modules. This lateral flow of gas between the module wall and the glass results in a progressive pressure drop across the width of the wall. However, the resulting area of nonuniform pressure directly adjacent the wall thickness and the area of reduced pressure at the exhaust zones between the modules is minimized by utilizing thin module walls (rarely averaging greater than 3/8 inch) and relatively low gas flow which permits the exhaust areas between the modules to be kept small yet adequate to exhaust the gas without building up back pressure. This is shown by the module pressure profile at the bottom of FIG. 6 wherein the dips shown in the pressure profile at the exhaust areas are sufficiently small to have no adverse effect on the moving supported material. Thus, a substantially uniform average module pressure is achieved, as shown in the broken line curve.

Each module 44 exhausts radially in all directions to the surrounding zones of lower pressure, resulting in the pressure profile shown. The pressure over the exhaust areas, while lower than the module pressure, generally is slightly above ambient pressure to provide a gas flow from the glass surface to the exhaust channel beneath the modules.

The modules disclosed herein may vary in size and contour. Square modules having outer dimensions of approximately one inch have been found to be generally satisfactory for the described treatment of the glass, the module size may well vary in dimensions from about 1/8 to 1 1/2 inches on each side and need not be square, there being numerous other geometric or irregular shapes equally suitable. To achieve satisfactorily uniform characteristics for glass or other material heated to a deformation temperature, the distance across the outer terminus of each module forming the bed should be no more than 1/2 of the correspondingly oriented dimension of the material and preferably should be less than 1/5 thereof. The module depth from the bottom to the open top may vary but must be substantial. Normally, it will be at least 1/4 inch deep and in most cases 1/2 to 1 1/2 inches or more.

FIGS. 7 and 8 illustrate an additional embodiment of a module suitable for use in the treating section 18. The module 100 is subdivided into four cavities, 102, 104, 106 and 108, each of which is supplied with gas from an orifice 110 connected to the plenum chamber through hollow stem 112. Each cavity functions, in effect, as a sub-module and the pressure profile across the entire internal width of the module is substantially flat with the advantage that gas pressure is provided as the traveling workpiece covers any one submodule and before the entire unit is covered.

In the above discussion, principal attention was given to the manner in which the lower or supporting module bed functions. As shown in the drawings and as discussed above, an upper bed of identical construction is dispersed above the glass. The modules of this bed apply the same general pressure profile to the upper side of the glass as has been described above and is illustrated in FIG. 6. However, the magnitude of the module pressure in the upper modules is lower than in the lower modules so that the gas is allowed to disperse itself between the modules.

Exactly the same automatic adjustment of the glass with respect to the lower termini of the upper modules occurs as has been discussed in connection with the lower bed. Thus, as the gap between the upper glass surface and the lower edge of the upper module decreases, the module pressure rises thus forcing the glass down and vice versa.

It is thus apparent that each bed provides a relatively quiescent support zone of substantially uniform pressure and an exhaust zone of lower pressure with boundaries therebetween. Over these boundaries (the outer edges of the modules) substantial gas flows. Because the width of the gaps between the glass surface and the module edges is kept less than 0.100 inch and usually about 0.01 to 0.05 inch, this gas flow creates considerable turbulence and heat is transferred between the glass and the gas at a very rapid rate and in a highly efficient manner. This materially facilitates the maintenance of the two surfaces at different temperatures as desired in the performance of the present process.

The area of the quiescent zone is quite large when compared to the area of the zone in which turbulent flow occurs. The change in direction of gas as it flows to exhaust increases the net average velocity of the gas flow which occurs at the module periphery as compared with that at the interior of the module. There is a tendency to strip away the thin boundary layer of insulating air on the surface of the sheet, so that the rate of heat transfer is greatly increased.

As previously explained the surfaces of the sheet are improved in smoothness by holding one surface at a temperature at which the glass is flowable while holding the other at a lower temperature. To maintain the cooler surface of the glass at the desired temperature, the adjacent module bed must be an effective heat sink.

In general, there is a substantial temperature difference between the heat source and the heat sink which are located on opposite sides of the glass. For example, with soda-lime glass of the composition normally characteristic of window or plate glass the temperature of the heat source on the side of the glass subjected to the higher temperature normally is above 1400° F., usually in the range of 1700 to 2000° F. The temperature of the glass surface thus directly exposed usually ranges from about 1400 to 1700° F.

The temperature of the heat sink on the opposite and cooler side of the glass is much lower, generally not below 500° F. and usually at least 200° to 300° F. below that of the adjacent surface and rarely exceeds 900° F. Sharp temperature differentials in the glass exceeding 600° F. should be avoided. Because 40 to 50 percent of the heat applied to the hot surface of the glass passes through the glass, the lower temperature sink should be sufficiently low to maintain the surface temperature at a value at or just above the strain point temperature of the glass.

With these high temperatures, however, it becomes very important to have good heat exchange between the heat sink and the surface at the lower temperature. The module system herein provided is especially valuable for this purpose.

Figure 9:
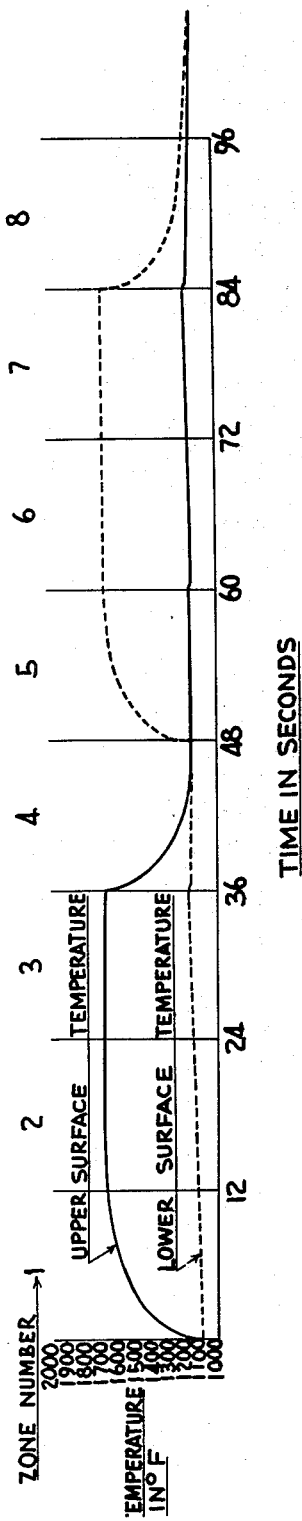
FIG. 9 illustrates typical time-temperature curves for the glass surfaces as the glass passes through the apparatus of FIG. 1.
Figure 10:
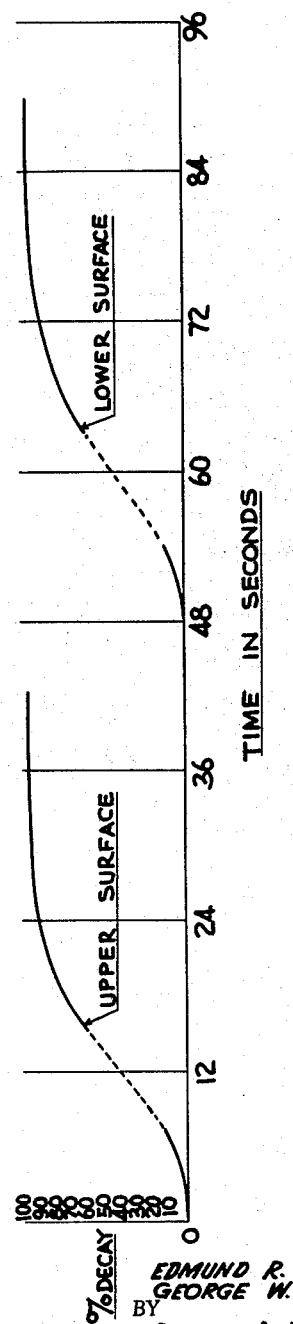
FIG. 10 illustrates typical time-decay rate curves for the removal of surface defects from the glass as the glass passes through the apparatus of FIG. 1 and in accordance with the temperature shown in FIG. 9.

Attention is now directed to the curves for soda-lime glass, such as conventional plate or window glass compositions shown in FIGS. 9 and 10. These curves illustrate a typical set of conditions resorted to in accordance with this invention. They are subdivided into sections which correspond to the sections of the apparatus 18. In FIG. 9 there is a representative time-temperature curve for the surfaces of the glass ribbon. The upper surface is represented by the solid line while the lower surface is represented by the broken line. Note that in the first section of the apparatus 18, the temperature of the upper surface is raised to an elevated temperature of about 1700° F. at which the glass at the surface is in flowable condition while the lower surface is maintained at a temperature below that temperature but above the strain point temperature, i.e., about 1150° F. In the second and third sections, the temperature of the upper surface is held at the elevated temperature of 1700° F. and the lower surface is maintained at the same conditions as in the first section. In the fourth section, the temperature of the upper surface is reduced from its elevated temperature to the temperature of the bottom surface, i.e., 1150° F., which is maintained at its previous temperature. The temperature relationship is then reversed with respect to the surfaces in the next and last four sections.

To raise the temperature of one surface of the glass, as in the first and fifth sections, requires more heat input than that required for maintaining a predetermined temperature. Thus, the individual heat input controls which adjust the temperature of the gas supplied to modules of each section are required for proper operation and to obtain the results desired.

For the curves described above the temperature of the gas supplied to the modules of sections 1 to 4 of the lower bed is 900° F. and is sufficient to maintain the adjacent glass surface at approximately 1150° F. The temperature of the gas supplied to sections 1 through 3 of the upper bed is 2000° F., and in Section 4 the gas temperature is 1000° F. Thereafter the temperatures of the various sections are reversed.

Generally, a ribbon of soda-lime glass of conventional sheet or plate glass composition is formed by the forming rolls and passes over the apron section to the surfacing section at a speed of about 60 inches per minute. The glass surface temperature decreases from approximately 1700° F. to approximately 1200° F. in passing across the apron and enters the treating apparatus at a temperature of approximately 1150° F. This temperature is above the strain point temperature of the glass but below the temperature at which the surface of the glass flows. The temperature of the bottom surface of the glass is maintained at approximately this temperature, i.e., 1150° F. during passage through the first four sections of the surfacing apparatus. Heat is applied to the upper surface to first bring the surface to a temperature of 1700° F. in the first surfacing section, hold it at this temperature during its passage through the next two sections and then permit it to cool to equilibrium temperature with the bottom surface of the glass in the fourth section. This procedure is repeated with respect to the opposite surfaces as the glass travels through the next and last four surfacing sections. The glass is delivered to the annealing lehr at approximately 1150° F. for annealing in any conventional manner.

In order to support and treat the glass, gas, in this instance, air, is supplied to the lower module beds at a pressure of 8 inches of water and to the upper module beds at a pressure of 7 inches of water. The glass, ¼ inch in thickness, is supported equidistant between the upper and lower beds spaced, for example, 0.020 inch from the beds.

A total elapsed time of 96 seconds is required for passage through the illustrated and described surfacing apparatus. Inspection of the ribbon of glass so formed and surfaced shows a brilliant, smooth surfaced glass substantially free of surface defects and comparable with quality plate glass.

While the higher temperature heat source has been shown as a module bed, other heat sources can be resorted to. This is especially the case in heating the upper surface to a flow temperature. In this instance the lower surface may be supported by the gas of the lower module and the upper surface may be heated by radiant heat sources as disposed above the ribbon.

It will also be understood that discontinuous sheets may be subjected to the same treatment. For example, sections of rough rolled glass may be cut from a ribbon and reheated to the temperatures herein contemplated.

Also, it is to be understood that the upper modules in sections 18e, 18f, 18g and 18h may be replaced with nozzles of various forms and arrangements for discharging heated gas onto the upper surface of the glass. Of course, any such devices should be chosen to have heat transfer coefficients equivalent to the modules described. In these sections, glass support is provided by the lower modules. For example, an individual nozzle may replace a single module, or the nozzles may be elongated, so as to discharge elongated streams of heated gas onto the glass. In any event, movement of the glass will average out any pressure differences so as to provide the degree of uniformity of temperature desired.

While the present invention has been described with particular reference to specific details thereof, it is not intended that such details shall be regarded as limitations upon the scope of the invention except insofar as included in the accompanying claims.

We claim:

1. A method of removing surface defects from glass sheet which comprises, exposing one surface of the glass to an elevated temperature at which the glass flows and for a sufficient time that the surface flows an simultaneously exposing the other surface of the glass to a temperature below that at which the glass flows and maintaining the temperature of said other surface below that at which it flows and above the strain point temperature of the glass.

2. A method as recited in claim 1 wherein the temperature differential between the surfaces does not exceed 600° F.

3. The method of claim 1 wherein at least one of said surfaces is exposed to a gaseous fluid having a temperature above 500° F.

4. A method of removing surface defects from glass sheet which comprises, supporting the glass upon a plurality of gas support zones from which supporting gas flows in contact with the lower surface of the glass, exposing one surface of the glass to an elevated temperature at which the glass flows and for a sufficient time that the surface flows, and simultaneously exposing the other surface of the glass to a temperature below the temperature at which the glass flows and maintaining the temperature of said other surface below that at which it flows and above its strain point temperature.

5. A method of removing surface defects from glass sheet which comprises exposing the upper surface of the sheet to a temperature at which the glass flows and for a sufficient time that the surface flows while supporting the glass upon a plurality of gas support zones from which supporting gas flows in contact with the lower surface of the glass and supplying support gas to said zones at a temperature below the temperature at which the glass flows and maintaining the temperature of said lower surface below that at which it flows and above the strain point strain point temperature of the glass.

6. The process of claim 5 wherein the temperature differential between the surfaces of the glass does not exceed 600° F.

7. A method of removing surface defects from glass sheet which comprises, exposing one surface of the glass to an elevated temperature at which the glass flows and for a sufficient time that the surface flows, simultaneously exposing the other surface of the glass to a temperature below that at which the glass flows and maintaining the temperature of said other surface below that at which it flows and above the strain point temperature of the glass, then exposing said other surface to an elevated temperature at which the glass flows and for a sufficient time that the surface flows, and simultaneously exposing said one surface to a temperature below that at which the glass flows and maintaining the temperature of said one surface below that at which it flows and above the strain point of the glass.

8. A method of removing surface defects from glass sheet which comprises, supporting the glass upon a plurality of gas support zones from which supporting gas flows in contact with the lower surface of the glass, exposing one surface of the glass to an elevated temperature at which the glass flows and for a sufficient time that the surface flows, simultaneously exposing the other surface of the glass to a temperature below that at which the glass flows and maintaining the temperature of said other surface below that at which it flows and above the strain point temperature of the glass, then exposing said other surface to an elevated temperature at which the glass flows and for a sufficient time that the surface flows, and simultaneously exposing said one surface to a temperature below that at which the glass flows and maintaining the temperature of said one surface below that at which it flows and above the strain point of the glass.

9. The method of claim 1 wherein the temperature differential between the surface is at least 200° F.

References Cited by the Examiner

UNITED STATES PATENTS

| | | | |
|---|---|---|---|
| 1,593,627 | 11/1923 | Gessner | 65—119 |
| 3,048,383 | 8/1862 | Champlin | 65—182 X |
| 3,083,505 | 4/1963 | Wynne | 65—65 |

DONALL H. SYLVESTER, *Primary Examiner.*

C. VAN HORN, G. R. MYERS, *Assistant Examiners.*